United States Patent [19]

Contino et al.

[11] 4,214,514
[45] Jul. 29, 1980

[54] COOKER FOR INDIVIDUAL PORTIONS OF PARTICULATE FOODSTUFF

[76] Inventors: Peter Contino, 32-64 33rd St., Astoria, Long Island City, N.Y. 11106; Nicholas M. Stiglich, 215-8th St., Cresskill, N.J. 07626

[21] Appl. No.: 10,126

[22] Filed: Feb. 7, 1979

[51] Int. Cl.² ............................................. A47J 27/00
[52] U.S. Cl. ......................................... 99/330; 99/337; 99/342; 99/348; 99/408; 99/410; 99/443 R; 426/509
[58] Field of Search ................. 99/330, 348, 408, 337, 99/338, 342, 336, 335, 334, 448, 407, 410, 427, 443 R; 426/508, 509; 126/373, 383, 385, 386

[56] References Cited

U.S. PATENT DOCUMENTS

| | | | |
|---|---|---|---|
| 2,650,536 | 9/1953 | Russell | 99/448 X |
| 3,608,473 | 9/1971 | Kearn | 99/336 |
| 3,839,951 | 10/1974 | Palmason | 99/330 |
| 3,928,045 | 12/1975 | Tsunoda | 99/330 |
| 3,958,503 | 5/1976 | Moore | 99/448 X |

Primary Examiner—Billy J. Wilhite
Attorney, Agent, or Firm—Robert E. Burns; Emmanuel J. Lobato; Bruce L. Adams

[57] ABSTRACT

A cooker for foodstuff in particulate form, in particular pasta, comprises a plurality of perforate pots, each of which is of a size to cook an individual portion. The pots are individually movable vertically in a tank between a raised position and a lower position. The foodstuff is put in the pot when in raised position. When the pot is lowered, boiling water pumped from a reservoir is injected into the pot to cook the foodstuff while stirring it to prevent its sticking to the pot or to itself. The water drains into the tank and is returned to a hot water reservoir. After a preset time interval the pot is returned to its raised position for discharge of the cooked foodstuff.

13 Claims, 7 Drawing Figures

CABINET ARRANGEMENT

AUTOMATIC POP-UP

PIPING DIAGRAM

CONTROL WIRING DIAGRAM

POWER WIRING DIAGRAM

COOKER FOR INDIVIDUAL PORTIONS OF PARTICULATE FOODSTUFF

FIELD OF INVENTION

The present invention relates to cooking individual portions of pasta or other particular foodstuff and especially to a cooker suitable for use in a restaurant or other eating place to cook individual portions of such food to order. The term "pasta" is herein used in a generic sense to include spaghetti, macaroni, noodles and other similar products.

BACKGROUND OF THE INVENTION

In restaurants and other eating places which serve Italian food, the spaghetti and other pasta is customarily cooked in bulk in large cooking vessels and individual portions of the pasta are dished out as orders for it are received. Only the first customers receive freshly cooked pasta. Later customers receive pasta which has become limp and soggy and is correspondingly unappetizing.

A modified procedure is to precook the spaghetti or other pasta in bulk and then keep it in cold water or in a refrigerator until it is needed. Individual portions of the pasta are then reheated and served. While this is some improvement over keeping the pasta hot in a large cooking vessel, the precooked, stored and reheated pasta does not have the appearance or taste of pasta that is freshly cooked.

SUMMARY OF THE INVENTION

It is an object of the present invention to overcome the disadvantages of the cooking methods described above by providing equipment by means of which individual portions of pasta or other particulate foodstuff can be expeditiously cooked to order so that each customer is served freshly cooked food.

In accordance with the invention a cooker for pasta and other particulate foodstuff comprises a plurality of pots arranged in a tank, each of the pots being of a size to receive an individual portion of the foodstuff. Each of the pots has an apertured bottom and an apertured side wall. After an individual portion of the foodstuff has been placed in a pot, boiling water is pumped from a reservoir and injected into the pot so as to cook the foodstuff therein and stir the foodstuff by circulation of the water so as to keep it from sticking to the pot or to itself. By reason of the perforations provided in the pot, the water drains from the pots into the tank during cooking of the foodstuff and is returned to the reservoir.

Preferably each of the pots is movable vertically between a lower cooking position and a raised position for loading the uncooked foodstuff and removing the foodstuff after it is cooked. The hot water is injected into the pot only when in lowered position. Preferably the lowering and raising of each pot is effected automatically by means including a timer for presetting cooking time.

BRIEF DESCRIPTION OF DRAWINGS

The nature, objects and advantages of the invention will appear more fully from the following description of the preferred embodiment shown by way of example in the drawings in which.

DESCRIPTION OF PREFERRED EMBODIMENT

Figure 1:
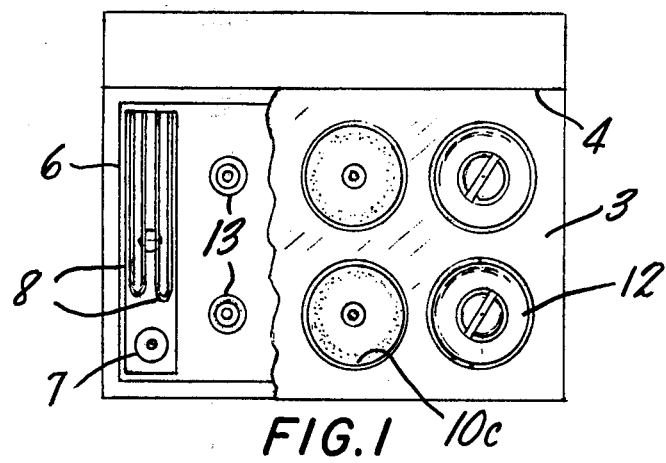
FIG. 1 is a plan of a cooker in accordance with the present invention, a portion of the top being broken away to show the interior.
Figure 2:
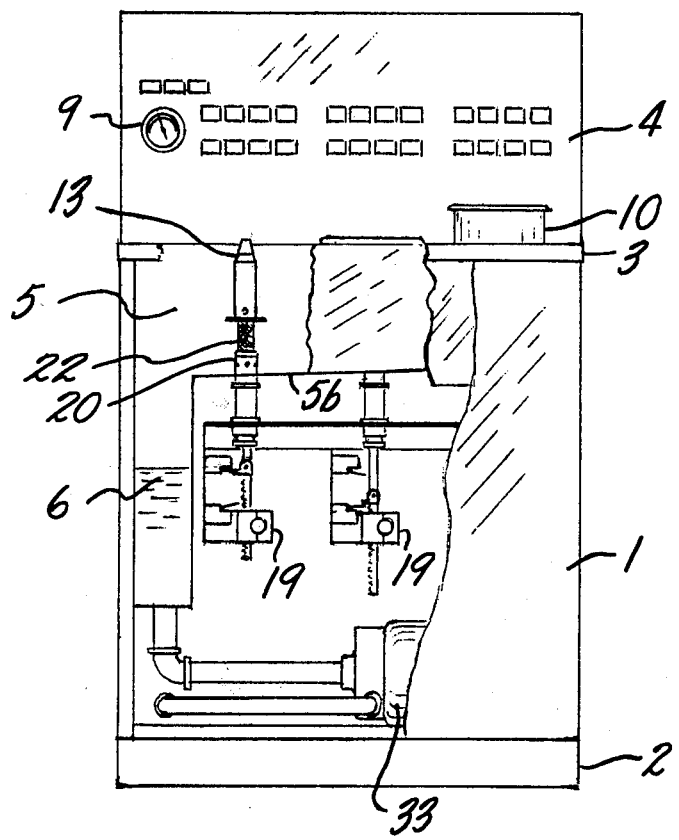
FIG. 2 is a front elevational view with portions broken away to show the interior.

While the cooker in accordance with the present invention is useful in cooking many different kinds of particulate foodstuffs, it will be described by way of example as a cooker for cooking individual portions of spaghetti or other pasta to order. As shown by way of example in the drawings, the cooker comprises a cabinet 1 having a base 2 and a top 3. A control and indicator panel 4 projects upwardly above the top 3 at the rear of the cabinet. In an upper portion of the cabinet there is a tank 5 which drains into a reservoir 6 which is located at one side of the cabinet and extends downwardly from the tank 5. The reservoir 6 is adapted to contain water the level of which is controlled by a ball switch 7. The water in the reservoir 6 is heated to a predetermined temperature by electrical heating elements 8.

The tank 5 is adapted to receiving a plurality of cooking pots 10 each of which is of a size to receive a single individual serving of pasta or other foodstuff. Each of the pots 10 has a cylindrical side wall 10a in which there are provided spaced apertures 11 and a bottom 10b having small holes 10c central opening. A removable cover 12 is provided for each of the pots. Each pot is individually supported by a cone 13 which extends up through the central aperture in the bottom of the pot and has an annular flange 13a on which the pot rests. The upper end 13b of the cone is tapered. An annular grommet 14 of heat resisting rubber or plastic material provides a seal between the pot and the cone. Near its lower end and just inside the pot, the cone is provided with holes 15 for injection of hot water into the pots as will be described below. The pots extend up through holes in the top 3 of the cabinet and can be lifted off the supporting cones 13 for removal from the cooker, for example to empty the cooked pasta.

In the embodiment of the invention shown by way of example in the drawings, means is provided for raising and lowering the pots 10 and for supplying hot water to the pots for cooking the pasta or other foodstuff therein. To provide for vertical movement of the pots, each of the cones 13 is supported by a rod 16 which extends down through the bottom 5b of the tank 5 and is connected at its lower end with a rack 17. The rack 17 meshes with a pinion 18 of a reversible gear reduction electric motor 19. A pot 10 supported on the flange 13a of the cone 13 can thus be lowered from the raised position shown in FIG. 3 to the lowered position shown in FIG. 4 by rotation of the motor pinion 18 in one direction and raised from the lower position to the upper position by rotation of the motor pinion in the opposite direction.

Figures 3, 4:
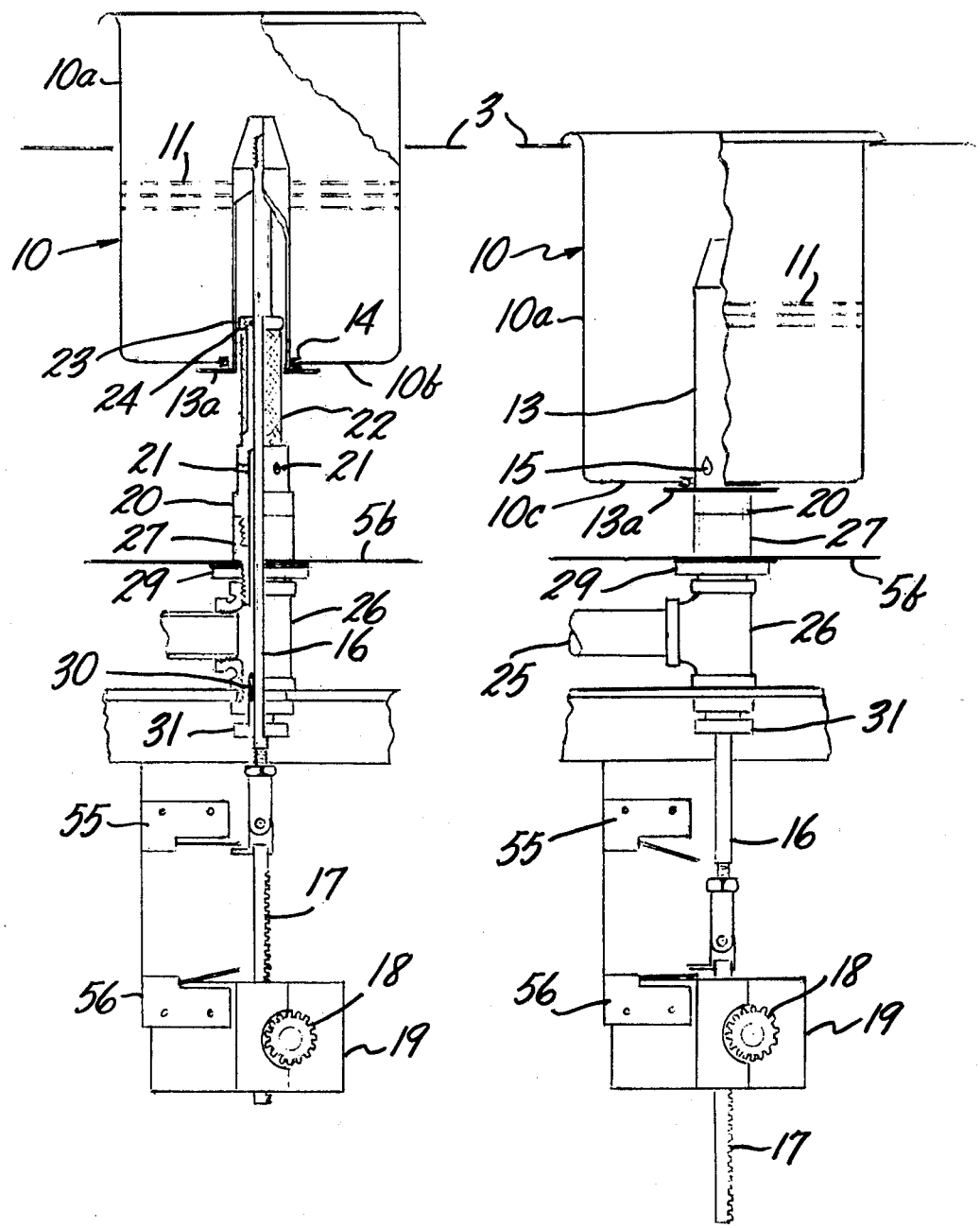
FIG. 3 is an enlarged elevational view showing a single pot with means for raising and lowering it, the pot being shown in raised position.
FIG. 4 is a view similar to FIG. 3 but showing the pot in lowered position.

Hot water is supplied to each of the pots 10 by a spindle 20 which is received inside the hollow cone 13 on which the pot is supported. The spindle 20 has holes 21 which register with the holes 15 of the cone 13 when the cone and pot are in lower position as illustrated in FIG. 4. An upper portion 20a of the spindle is of reduced diameter and is surrounded by a cylindrical mesh 22 which is retained by a nut 23. When the pot 10 and supporting cone 13 are in raised position as shown in FIG. 3, water can drain from the pot through the holes 15 and past the mesh 22. Water is supplied to each of the spindles 20 by a pipe 25 provided with a T-fitting 26 connected with the nipple by an adaptor 27 which extends through the bottom 5b of the tank 5. A watertight seal is provided by a gasket 28 and nut 29 screwed onto a threaded portion of the adaptor 27. The rod 16 by which the cone 13 and pot 10 are supported extend up through the T-fitting 26, adaptor 27 and spindle 20. A watertight seal with the T-fitting 26 is provided by a gland 30 and gland nut 31. At the upper end of the spindle, a seal is provided by an O-ring 24.

Figure 5:
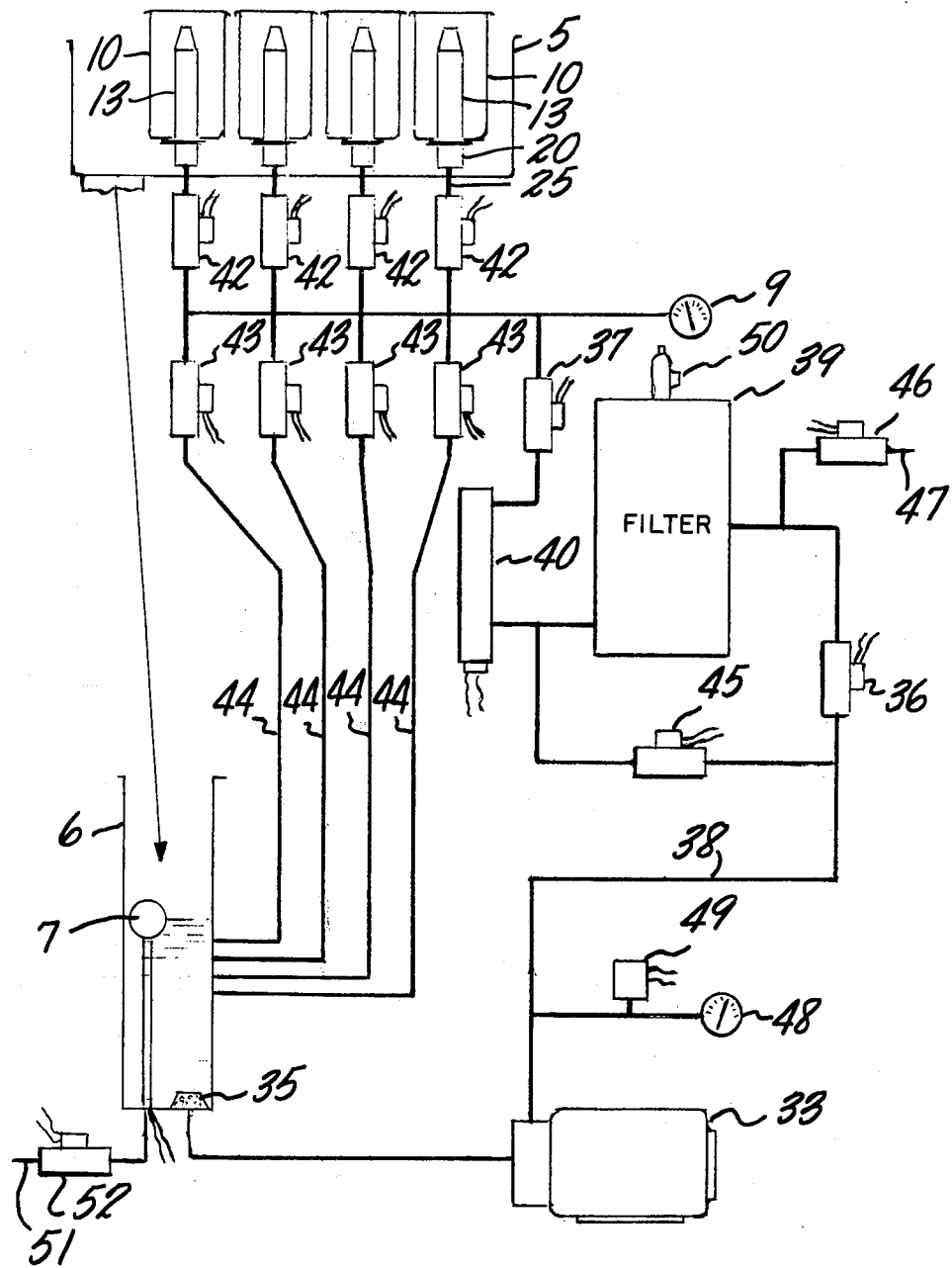
FIG. 5 is a piping diagram of the cooker.

Hot water under pressure is supplied to the spindles 20 when the pots are in lowered position by a pump 33 through the water circuit shown schematically in FIG. 5. The pump 33 takes water from the reservoir 6 through a line 34 and strainer 35. When solenoid valves 36 and 37 are open, hot water under pressure is delivered by the pump 33 through a line 38, filter 39 and booster heater 40 to a header line 41 to which the supply pipes 25 of the spindle are individually connected through solenoid valves 42. When a pot is in lowered position, the corresponding solenoid valve 42 is open to supply hot water to the pot. When a pot is in raised position, the valve 42 is closed and a corresponding return valve 43 is opened to permit water to return to the reservoir 6 through a return line 44. A temperature gauge 9 on the panel 4 indicates the temperature of water in the header line 41. The filter 39 is designed to remove starch and other solid particles from the recirculated water. In order to prolong the useful life of the filter, provision is made for backwashing the filter to remove accumulated solids. Backwash is effected by closing solenoid valves 36 and 37 and opening solenoid valves 45 and 46 so that water flows through the filter 39 in reverse direction and is discharged through a waste line 47.

Pressure in the deliver line of the pump 33 is indicated by a pressure gauge 48 on the panel 4. A pressure responsive switch 49 shuts off the pump 33 in the event the pressure exceeds a predetermined value. Moreover, a safety valve 50 is provided on the filter 39.

Water is supplied to the reservoir 6 from a supply line 51 through a solenoid valve 52 controlled by the ball switch 7 in the reservoir. Water is thus supplied to the reservoir 6 for initially filling the reservoir to a desired level when the cooker is put into operation and for supplying make-up water to replace water lost through evaporation and absorption by the foodstuff or through backwashing of the filter 39.

In order to simplify the drawing, only four pots are shown in FIG. 5. However, it will be understood that the number of pots can be increased or decreased according to the desired capacity of the cooker.

Figure 6:
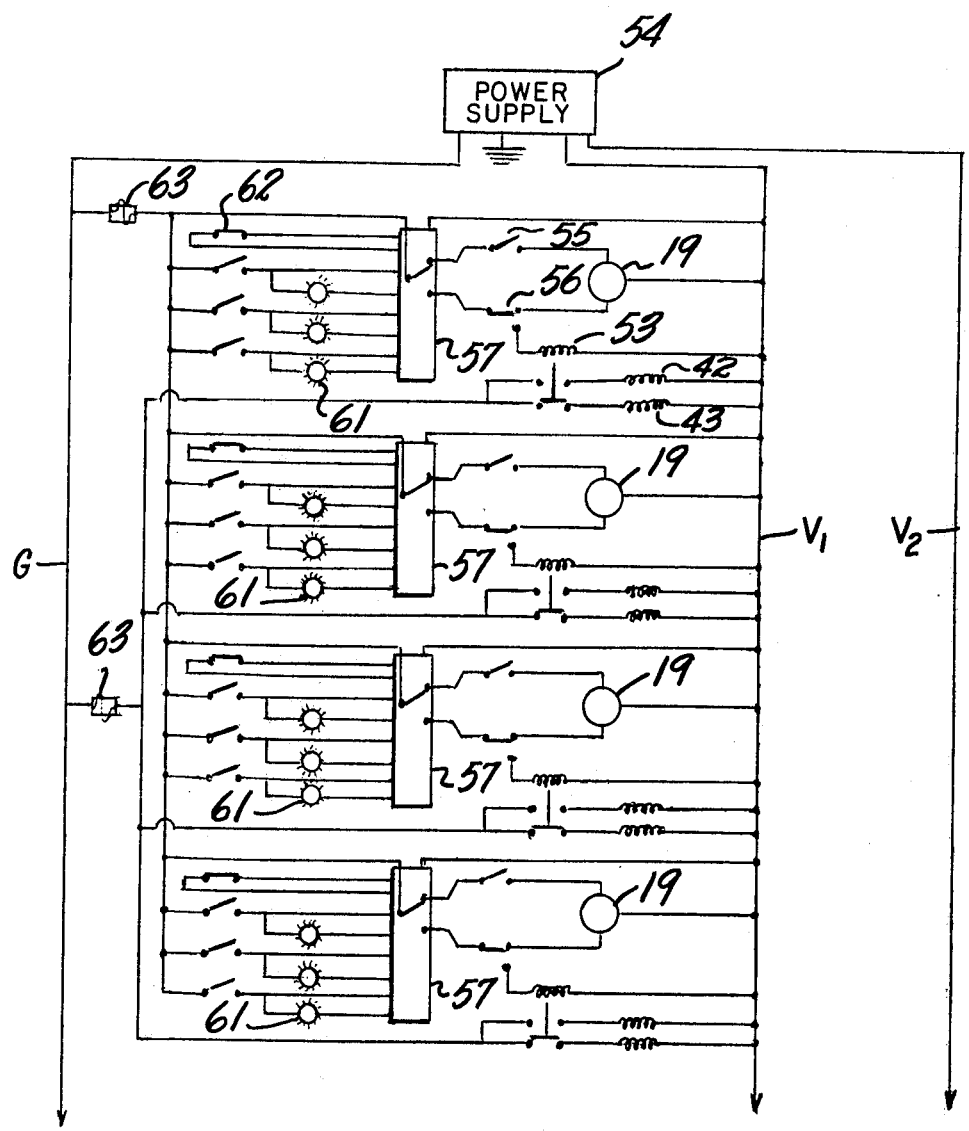
FIG. 6 is a control wiring diagram.
Figure 7:
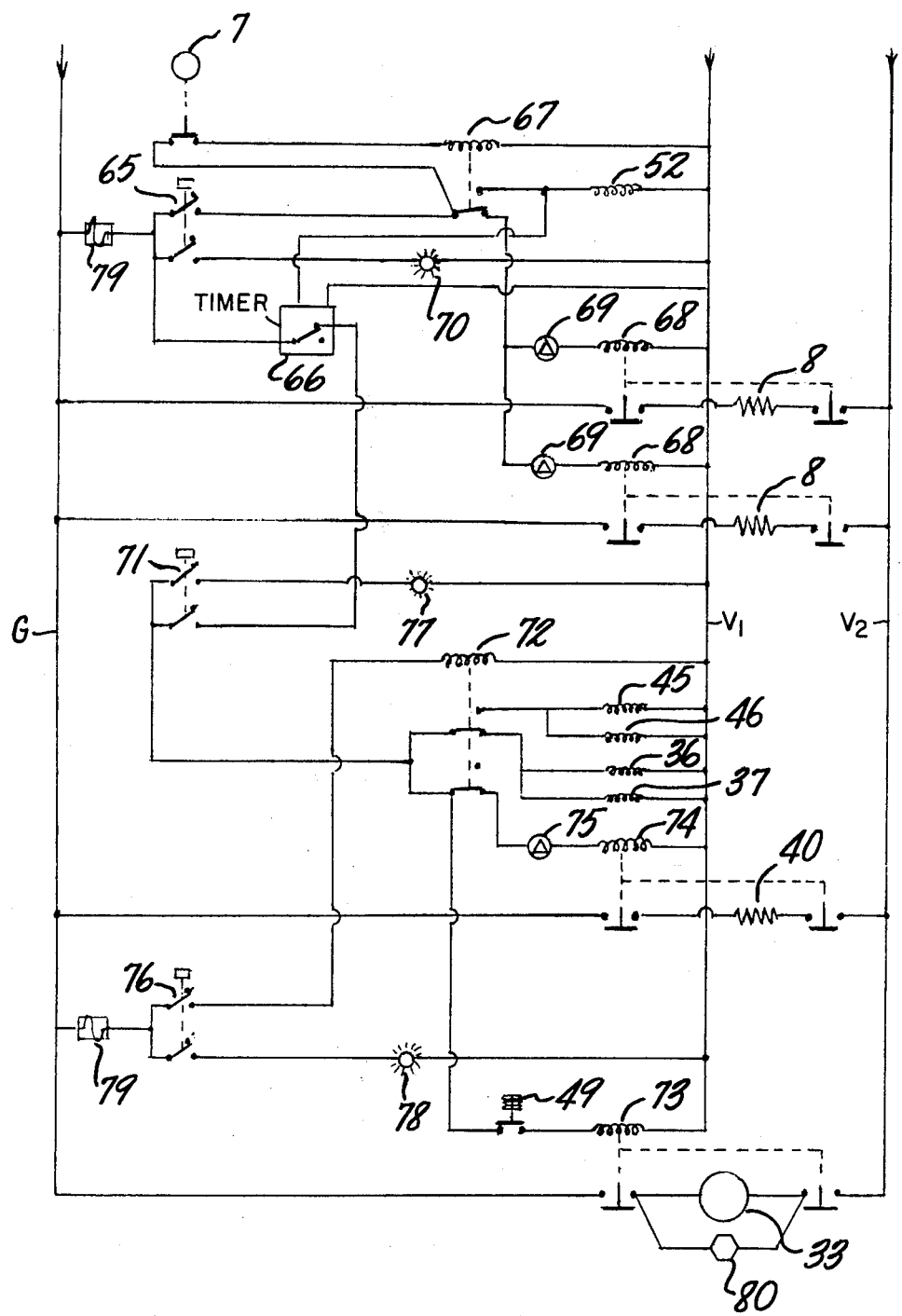
FIG. 7 is a power wiring diagram.

Electric circuitry of the cooker is shown in FIGS. 6 and 7. While circuitry is shown for only four pots, it will be understood that the number of pots can be increased or decreased as desired. A power supply 54 provides lower voltage—for example 110 volts AC—between a ground line G and a low voltage line $V_1$ for control circuits and a higher voltage—for example 220 volts AC—between the ground line G and a high voltage line $V_2$ for a power circuit for operating the pump 33 and water heaters 8 and 40.

As seen in FIG. 6, each of the gear reduction motors 19 for lowering and raising the corresponding pot 10 is controlled by upper and lower limit switches 55 and 56 and by a timer 57 which may be mechanical, electrical or combined mechanical and electrical. The timer 57 is designed to provide two different cooking times and is controlled by push button switches 58, 59 and 60 on the panel 4. The desired cooking time is selected by pushing either push button 58 or 59. After the pasta has been put in the corresponding pot and the cover 12 has been placed on the pot, push button 60 is pushed to initiate the cooking process. As upper limit switch 55 is open and lower limit switch 56 is closed, the motor 19 is energized to run in a direction to lower the cone 13 and the pot supported thereby. When the pot reaches the lower limit of its travel, lower limit switch 56 is opened to stop the motor 19. The lower limit switch 56 is a double throw switch. When the pot reaches the lower limit of its travel, the switch 56 is actuated to energize a relay 53 which operates to open solenoid valve 42 (see FIG. 5) and close solenoid valve 43 thereby supplying hot water from the header line 41 to the lowered pot. Indicator lights 61 on the panel 4 indicate the operation of the several push buttons 58–60. At the end of the cooking time, the timer operates to energize the motor 19 to raise the pot. When the pot is raised, the relay 50 is deenergized so as to close solenoid valve 42 and open solenoid valve 43. Water is thereby cut off from the spindle 20 and instead is returned to the reservoir 7 through the return line 41. A fourth push button 62 is provided on the panel 4 for raising a pot prior to its being raised under control of the timer 57. When the push button 62 is operated, the pot is raised, solenoid valve 42 is closed and solenoid valve 43 is opened to return the water to the reservoir. Fuses 63 protect the control circuitry.

During the cooking cycle, hot water under pressure supplied by the pump 33 is injected into a lower portion of each of the lowered pots through holes 21 in the spindle 20 which registered with holes 15 in the cones 13. The pasta is thereby cooked by action of the hot water and at the same time is stirred by the jets of water entering through the holes 15 so as to keep the pasta from sticking to the pot or to itself. The water is discharged through the openings 11 in the side wall of the pot which in cooperation with the rate of flow of the injected water determine the water level in the pot. When the pot is raised at the end of the cooking cycle, the water in the pot drains out through holes 10c and 15 and through the mesh 22. Water discharged into the tank 5 drains back into the reservoir 6.

Controls for the water circuit shown in FIG. 5 including pump, heater and valve controls are shown in FIG. 7. When it is desired to put the cooker into operation—starting with the reservoir 6 empty—a push button switch 65 on the panel 4 is depressed to close a circuit which activates a timer 66 and to provide power for the float switch 7. The float, being in lower position, activates a relay 67 so that solenoid valve 52 is opened to permit water to enter the reservoir from the supply line 51. When the proper water level is reached, the float switch 7 opens and permits power to flow to relays 68 to supply power to heating elements 8 in the reservoir 6 if thermostats 69 are closed. When the proper temperature is reached, thermostat 69 open to shut off power to the heating elements. A light 70 on the panel 4 indicates operation of the push button 65.

In the event no water enters the reservoir 6 or the water level does not reach a predetermined level within a predetermined time, the timer 66 will open so that no power can be supplied to the pump 33 or the booster heater 40. If the required water level in the reservoir is reached within the prescribed time, depressing a push button 71 will provide power for a relay 72 so that relay 73 can be activated to start the pump 33, provided the pressure is within the limit of pressure switch 49. Relay 74 is also operated to supply current to the booster heater 40 provided that a thermostat 75 controlling water temperature is closed. Power is also supplied for operating the solenoid valves 36, 37, 45 and 46 under control of a push button switch 76 on the panel 4. When switch 76 is in opened position as shown, solenoid valves 36 and 37 are open to provide hot water to the pots 10 (when in lowered position) as described above. When the push button switch 76 is depressed, solenoid valves 36 and 37 are closed and solenoid valves 45 and 46 are opened to provide backwashing of the filter 39 as described above. Lights 77 and 78 on the panel 4 indicate the operation of push button switches 71 and 76 respectively. The circuitry shown in FIG. 7 is protected by fuses 79. A clock 80 connected in parallel with the pump 33 records the time the pump is in operation and thus gives an indication as to when the filter should be backwashed or replaced or other servicing should be carried out on the equipment.

The operation of the cooker in accordance with the invention will be readily understood from the foregoing description. Starting up of the cooker is effected by pushing push button switch 65 to fill the reservoir 6 with water to the desired level and to energize heating elements 8 to bring the water up to the desired temperature which may be for example about 190°. Push button switch 71 is then depressed to start the pump 33, energize the booster heater 40 and to supply current to open solenoid valves 36 and 37. With the machine thus readied for operation and with the pots 10 in raised position, pasta or other foodstuff to be cooked is then placed in one or more of the pots 10 and the cover 12 is put on. For the pots into which foodstuff has been placed, push button 58 or push button 59 is depressed to provide the desired cooking time and then push button 60 is depressed to start the cooking cycle under control of the timer 57. In the cooking cycle, the pot is lowered to its lower position and water is supplied through the spindle 20 to cook the foodstuff while keeping it in a continual state of circulation. The water is continually filtered by the filter 39 and its temperature is raised to the desired cooking temperature, e.g. 205° F., by the booster heater 40. At the end of the cooking time as selected by the push button 58 or 59 and controlled by the timer 57, the water is shut off and the pot is raised, whereupon any water remaining in the pot is drained off through the holes 10c in the bottom of the pot and the holes 15 in the cone 13. The pot can then be lifted off the cone 13 for emptying the cooked foodstuff from the pot. The pots are preferably Teflon coated so that the contents can easily be removed by inverting the pot. It will be noted that the pots are operable individually and independently from one another so that one, some or all of the pots can be used. Moreover, the cooking time for each pot is selected individually so that the foodstuff in different pots can be cooked different periods of time as desired.

It will be noted that the water for cooking the foodstuff is recirculated so that the energy required for heating the water is conserved. During recirculation of the water, starch and other solid material is removed by the filter 39. When it is desired periodically to backwash the filter to remove the material collected, this is accomplished by depressing push button 76 whereupon solenoid switches 36 and 37 are closed and solenoid switches 45 and 46 are opened so as to cause water to flow in reverse direction through the filter 39 and be discharged through the waste conduit 47.

While a preferred embodiment of the invention is illustrated in the drawings and is herein particularly described, it will be understood that many variations and modifications may be made and that the invention is thus in no way limited to the illustrated embodiment.

What is claimed is:

1. Cooker for foodstuff in particulate form in particular pasta, comprising a tank, a plurality of pots in said tank, said pots being individually movable vertically between an upper position and a lower position and being removable from said tank, each of said pots being of a size to receive an individual portion of foodstuff and having an apertured bottom and an apertured side wall, a reservoir for water for use in cooking said foodstuff, means for heating said water to a selected cooking temperature, a water circuit for supplying hot water from said reservoir to said pots under pressure, jet means receiving hot water under pressure from said water circuit and directing it into said pots when in lower position to cook foodstuff therein and to stir said foodstuff by circulation of said hot water in said pots as said foodstuff is being cooked, said water draining from said pots into said tank during cooking of said foodstuff, and means for returning said water from said tank to said reservoir to keep the water level in said tank below that in said pots.

2. Cooker according to claim 1, comprising means for moving said pots between said upper position and lower position and associated means in said water circuit for controlling the supply of water to said pots whereby water is supplied to said pots only when said pots are in said lower position.

3. Cooker according to claim 2, in which said means for moving said pots between said upper and lower positions comprises means for moving said pots individually.

4. Cooker according to claim 3, comprising electrical circuit means controlling movement of said pots individually between said upper and lower positions and including timing means for automatically raising each said pot to upper position after a preset time in said lower position.

5. Cooker according to claim 2, in which said means for moving said pots between said upper and lower positions comprises vertically movable hollow cones in said tank, said pots having central openings in their bottoms to receive said cones, and means for individually raising and lowering said cones.

6. Cooker according to claim 5, in which said jet means comprises spindles connected with said water circuit and received in said hollow cones, said cones having apertures through which water is injected by said jet means into said pots when in lower position.

7. Cooker according to claim 6, in which said water circuit comprises a header, a pump having an intake and a discharge, first means connecting the intake of said pump with said reservoir, second means connecting the discharge of said pump with said header, and third means connecting said header individually with each of said spindles, said third means including a valve between said header and each of said spindles, and means for individually controlling each of said valves.

8. Cooker for foodstuff in particulate form, in particular pasta, comprising a tank, a plurality of pots in said tank, said pots being of a size to receive individual portions of foodstuff, each of said pots having an apertured bottom and an apertured side wall, a reservoir for water for use in cooking said foodstuff, means for heating said water to a selected cooking temperature, a water circuit for supplying water from said reservoir to said pots under pressure, jet means receiving hot water under pressure from said water circuit and directing it into said pots to cook foodstuff therein and to stir said foodstuff by circulation of said water as said foodstuff is being cooked, said water draining from said pots into said tank during cooking of said foodstuff, and means for returning said water from said tank to said reservoir, said water circuit comprising a header, a pump having an intake and a discharge, first means connecting the intake of said pump with said reservoir, second means connecting the discharge of said pump with said header, and third means connecting said header with said jet means for each of said pots, said third means including a supply valve between said header and each of said jet means, and means for individually controlling said supply valves.

9. Cooker according to claim 8, in which said second means includes a filter for filtering out solids from the water, including starch.

10. Cooker according to claim 9, further including means for backwashing said filter.

11. Cooker according to claim 8, further including means connecting said header with said reservoir including valve means comprising a plurality of return valves each of which corresponds to one of said supply valves, and means for opening each of said return valves when the corresponding supply valve is closed.

12. Cooker according to claim 8, in which said second means connecting said pump with said header includes a booster heater between said pump and said header.

13. Cooker according to claim 1 or claim 8, in which there are at least four of said pots.

* * * * *